(12) United States Patent
Kauffmann et al.

(10) Patent No.: US 11,381,757 B2
(45) Date of Patent: Jul. 5, 2022

(54) IMAGING SYSTEM AND METHOD

(71) Applicant: MOTHERSON INNOVATIONS COMPANY LIMITED, London (GB)

(72) Inventors: Maximilian Kauffmann, Ostfildern (DE); Kai Uwe Hagenburg, Esslingen (DE)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 16/440,433

(22) Filed: Jun. 13, 2019

(65) Prior Publication Data
US 2020/0396393 A1    Dec. 17, 2020

(51) Int. Cl.
*B60R 1/00*     (2022.01)
*H04N 5/265*    (2006.01)
(Continued)

(52) U.S. Cl.
CPC ............. *H04N 5/265* (2013.01); *B60R 1/00* (2013.01); *G06T 3/40* (2013.01); *G06T 5/009* (2013.01); *G06T 11/001* (2013.01); *H04N 5/445* (2013.01); *B60R 2300/207* (2013.01); *B60R 2300/303* (2013.01); *G06T 2207/10024* (2013.01); *G06T 2207/20021* (2013.01);
(Continued)

(58) Field of Classification Search
CPC .......... H04N 5/265; H04N 5/445; B60R 1/00; G06T 3/40; G06T 5/009; G06T 11/001
See application file for complete search history.

(56) References Cited

U.S. PATENT DOCUMENTS

| | | | |
|---|---|---|---|
| 2009/0179916 A1* | 7/2009 | Williams | G06T 7/80 345/629 |
| 2012/0002890 A1* | 1/2012 | Mathew | H04N 5/2355 382/232 |

(Continued)

FOREIGN PATENT DOCUMENTS

| | | |
|---|---|---|
| DE | 112016002268 T5 | 2/2018 |
| EP | 2191457 | 6/2010 |

(Continued)

OTHER PUBLICATIONS

Extended European Search Report dated Oct. 15, 2020 of European application No. 20179835.2.

*Primary Examiner* — Dave Czekaj
*Assistant Examiner* — Berteau Joisil
(74) *Attorney, Agent, or Firm* — Jones Day

(57) ABSTRACT

An imaging system includes an image sensor and an image signal processor (ISP). The image sensor generates image data including a set of pixel values. The ISP defines a first subset of pixel values from the set of pixel values. The first subset of pixel values corresponds to at least one region of interest. The ISP defines a second subset of pixel values that is complementary to the first subset of pixel values. The ISP generates a first sub-image based on the second subset of pixel values. The ISP processes the first subset of pixel values to generate a second sub-image. Processing the first subset of pixel values includes at least one of changing a color of one or more pixel values from the first subset of pixel values and scaling the first subset of pixel values. The ISP merges the first and second sub-images to generate an output image.

17 Claims, 20 Drawing Sheets

(51) Int. Cl.
*G06T 3/40* (2006.01)
*G06T 5/00* (2006.01)
*G06T 11/00* (2006.01)
*H04N 5/445* (2011.01)

(52) U.S. Cl.
CPC ............ *G06T 2207/20024* (2013.01); *G06T 2207/20208* (2013.01); *G06T 2207/20221* (2013.01); *G06T 2207/30252* (2013.01)

(56) References Cited

U.S. PATENT DOCUMENTS

| | | | |
|---|---|---|---|
| 2012/0195469 A1* | 8/2012 | Kirenko | G06T 7/38 382/103 |
| 2012/0229596 A1* | 9/2012 | Rose | H04N 5/2624 348/36 |
| 2012/0262600 A1 | 10/2012 | Velarde et al. | |
| 2014/0293051 A1* | 10/2014 | Nakamura | G06K 9/00791 348/148 |
| 2017/0201681 A1* | 7/2017 | Picalausa | H04N 5/04 |
| 2020/0143525 A1* | 5/2020 | Hu | G06F 17/18 |

FOREIGN PATENT DOCUMENTS

| | | |
|---|---|---|
| EP | 2843937 A1 | 3/2015 |
| EP | 3292024 | 3/2018 |
| WO | WO 2018/009897 A1 | 1/2018 |
| WO | WO 2018/136426 | 7/2018 |

\* cited by examiner

IMAGING SYSTEM AND METHOD

TECHNICAL FIELD

The present disclosure relates generally to imaging systems and methods, and more specifically to imaging systems and methods for vehicles.

BACKGROUND

Vehicles may include one or more cameras and one or more displays to display areas that are not generally visible to a driver, for example, areas to the rear of the vehicle or in a blindspot. An image captured by a camera may include additional information for alerting the driver. Such information is often overlaid on the image after the image has been processed and generated by an image processor. One common disadvantage of overlaying an image is an increase in additional processing. This additional processing for overlaying information on the image may increase processing time and computing requirements.

SUMMARY

In one aspect, the present disclosure provides an imaging system for a vehicle. The imaging system includes an image sensor, an image signal processor (ISP) and a display device. The image sensor is disposed on the vehicle. The image sensor is configured to generate image data. The image data includes a set of pixel values. The ISP is communicably coupled to the image sensor. The ISP is configured to receive the image data from the image sensor. The ISP is further configured to define a first subset of pixel values from the set of pixel values. The first subset of pixel values corresponds to at least one region of interest in the image data. The ISP is further configured to define a second subset of pixel values from the set of pixel values. The second subset of pixel values is complementary to the first subset of pixel values. The ISP is further configured to generate a first sub-image based on the second subset of pixel values. The ISP is further configured to process the first subset of pixel values to generate a second sub-image. Processing the first subset of pixel values includes at least one of: (i) changing a color of one or more pixel values from the first subset of pixel values; and (ii) scaling the first subset of pixel values. The ISP is further configured to merge the first and second sub-images to generate an output image. The display device is configured to display the output image received from the ISP.

In an example, the at least one region of interest may correspond to one or more distance lines with respect to the vehicle.

In an example, the at least one region of interest may include at least one of an object or an icon.

In an example, the processing of the first subset of pixel values may include changing a color of each pixel value of the first subset of pixel values.

In an example, the processing of the first subset of pixel values may further include filtering out at least one of red, green and blue colors from each pixel value of the first subset of pixel values.

In an example, the processing of the first subset of pixel values may include magnifying the first subset of pixel values.

In an example, the ISP may be further configured to perform high dynamic range (HDR) processing of the first subset of pixel values.

In an example, the ISP may be further configured to perform high dynamic range (HDR) processing of the second subset of pixel values.

In another aspect, the present disclosure provides an imaging method for a vehicle. The method includes receiving image data from an image sensor disposed on the vehicle. The image data includes a set of pixel values. The method further includes defining a first subset of pixel values from the set of pixel values. The first subset of pixel values corresponds to at least one region of interest in the image data. The method further includes defining a second subset of pixel values from the set of pixel values. The second subset of pixel values is complementary to the first subset of pixel values. The method further includes generating a first sub-image based on the second subset of pixel values. The method further includes processing the first subset of pixel values to generate a second sub-image. Processing the first subset of pixel values includes at least one of: (i) changing a color of one or more pixel values from the first subset of pixel values; and (ii) scaling the first subset of pixel values. The method further includes merging the first and second sub-images to generate an output image. The method further includes displaying the output by a display device disposed on the vehicle.

In an example, the at least one region of interest may correspond to one or more distance lines with respect to the vehicle.

In an example, the at least one region of interest may include at least one of an object or an icon.

In an example, the processing of the first subset of pixel values may include changing a color of each pixel value of the first subset of pixel values.

In an example, the processing of the first subset of pixel values may include magnifying the first subset of pixel values.

In an example, the imaging method may further include performing high dynamic range (HDR) processing of the first subset of pixel values.

In an example, the imaging method may further include performing high dynamic range (HDR) processing of the second subset of pixel values.

In one aspect, the present disclosure provides an imaging system for a vehicle. The imaging system includes an image sensor, and an image signal processor (ISP) and a display device. The image sensor is disposed on the vehicle. The image sensor is configured to generate image data. The image data includes a set of pixel values. The ISP is communicably coupled to the image sensor. The ISP is configured to receive the image data from the image sensor. The ISP is further configured to define a first subset of pixel values from the set of pixel values. The first subset of pixel values corresponds to a plurality of distance lines with respect to the vehicle. The ISP is further configured to define a second subset of pixel values from the set of pixel values. The second subset of pixel values is complementary to the first subset of pixel values. The ISP is further configured to generate a first sub-image based on the second subset of pixel values. The ISP is further configured to process the first subset of pixel values to generate a second sub-image. Processing the first subset of pixel values includes at least one of: (i) changing a color of one or more pixel values from the first subset of pixel values; and (ii) scaling the first subset of pixel values. The ISP is further configured to merge the first and second sub-images to generate an output image. The display device is configured to display the output image received from the ISP.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the disclosure is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the disclosure. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

It is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the disclosure or the appended claims. Further, it should be understood that any one of the features can be used separately or in combination with other features. Other systems, methods, features, and advantages of the disclosure will be or become apparent to one with skill in the art upon examination of the detailed description. It is intended that all such additional systems, methods, features, and advantages be included within this description, be within the scope of the present disclosure, and be protected by the accompanying claims.

Figure 1:
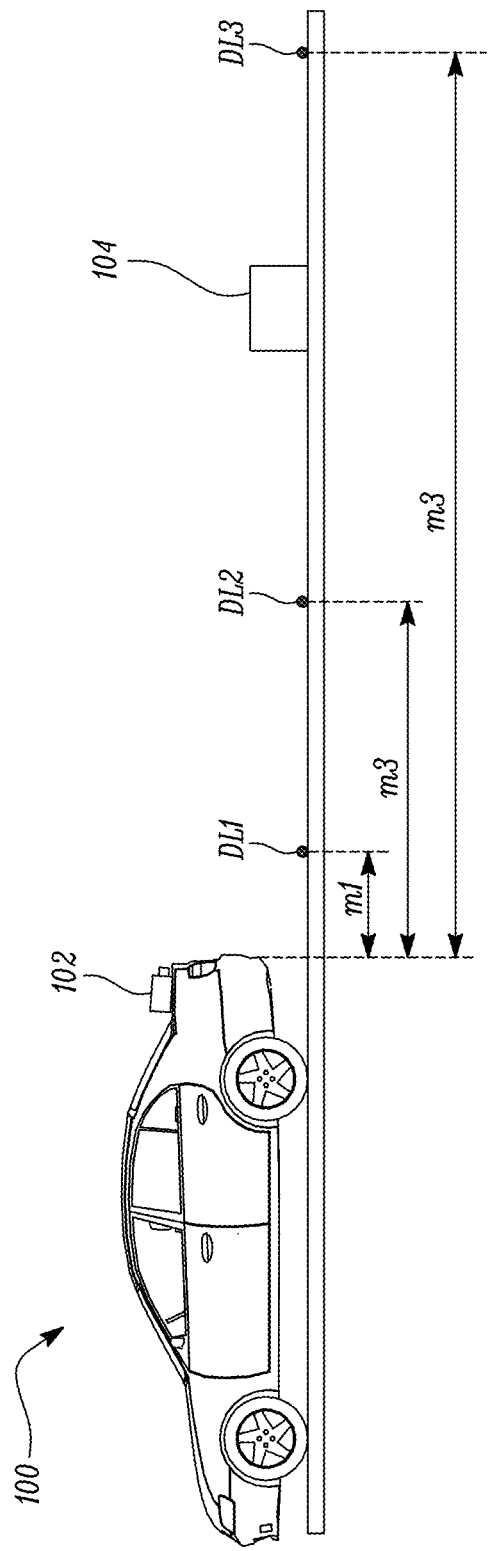
FIG. 1 is a schematic side view of an example of a vehicle.

Referring now to the Figures, FIG. 1 illustrates an example of a vehicle 100. A camera 102 is disposed on the vehicle 100. The camera 102 may provide images from all angles around the vehicle 100 depending on the requirements of a driver or an occupant of the vehicle 100. For example, the camera 102 may help the driver to view areas rear of the vehicle 100. Further, the camera 102 may also be used to view areas to the side of the vehicle 100. The camera 102 may also enable the driver to view areas in a blindspot. The camera 102 may be provided at any location on the vehicle 100, for example, a rear of the vehicle 100, a side of the vehicle 100, and so forth. The camera 102 may be fixedly or adjustably mounted on the vehicle 100. The camera 102 may be configured to acquire both still images and moving images (e.g., video). Further, the camera 102 may be a digital camera. Though one camera 102 is shown in FIG. 1, multiple cameras may be disposed at different locations on the vehicle 100. Although the vehicle 100 is illustrated as a passenger car in FIG. 1, the camera 102 may be used with other types of vehicles, for example, buses, trucks, off-road vehicles, motorcycles, aircrafts, bicycles, trams, locomotives, heavy-duty vehicles used in construction and earthworking, and so forth.

Figure 2:
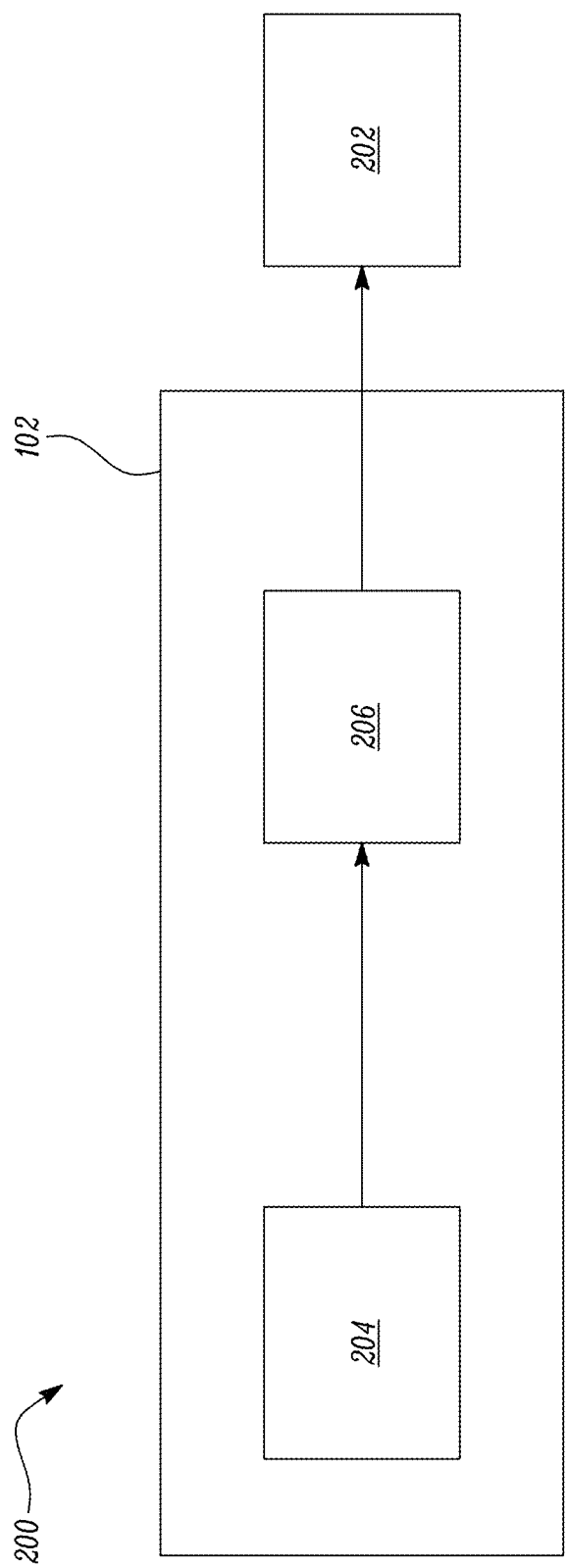
FIG. 2 is a block diagram of an example of an imaging system for a vehicle.

FIG. 2 illustrates an imaging system 200 for a vehicle such as the vehicle 100 described in FIG. 1. Referring to FIGS. 1 and 2, the imaging system 200 includes the camera 102 and a display device 202. The camera 102 includes an image sensor 204 and an image signal processor (ISP) 206. Though one image sensor 204 is illustrated in FIG. 2, the camera 102 may include multiple image sensors. The camera 102 may further include a lens (not shown). The image sensor 204 is disposed on the vehicle 100 and configured to generate image data. The ISP 206 is communicably coupled to the image sensor 204. The ISP 206 may be connected to the image sensor 204 by wired connections, wireless connections, or a combination thereof. The display device 202 may be disposed on the vehicle 100 such as in a rear view device and is communicably coupled to the ISP 206. The display device 202 may be connected to the ISP 206 by wired connections, wireless connections, or a combination thereof. Though in the illustrated example of FIG. 2 the ISP 206 is shown to be part of the camera 102, in alternative examples, the ISP 206 may be part of a separate processing device which is communicably coupled to one or more image sensors. The imaging system 200, as shown in FIG. 2, is exemplary in nature. In other embodiments, the imaging system 200 may include multiple cameras and/or multiple display devices. In some cases, the display device 202 may simultaneously or selectively display multiple images from multiple cameras.

The image sensor 204 may be configured to capture and convert light into electrical signals. For example, the image sensor 204 may include a CMOS image sensor (e.g., a CMOS active-pixel sensor (APS)) or a CCD (charge-coupled device) sensor. Generally, the image sensor 204 of the camera 102 includes an integrated circuit having an array of pixels, where each pixel includes a photodetector for sensing light. The image sensor 204 may further include a color filter array (CFA) that may overlay or be disposed over the pixel array of the image sensor to capture color information. The color filter array may include a Bayer color filter array. The color filter array may include an array of small color filters, each of which may overlap a respective pixel of the image sensor and filter the captured light by wavelength.

When used in conjunction, the color filter array and the photodetectors may provide both wavelength and intensity information with regard to light captured through the camera 102, which may be representative of a captured image.

The ISP 206 may provide for various image processing steps, such as defective pixel detection/correction, lens shading correction, demosaicing, high dynamic range (HDR) processing, image sharpening, noise reduction, gamma correction, image enhancement, color-space conversion, image compression, chroma sub-sampling, color shifting, edge enhancement, image scaling operations, other types of pixel manipulation, and so forth. In some examples, the ISP 206 may include various subcomponents and/or discrete units of logic that collectively form an image processing pipeline for performing each of the various image processing steps. These subcomponents may be implemented using hardware (e.g., one or more processors) or software, or via a combination of hardware and software components. The processor(s) of the ISP 206 may include one or more microprocessors, such as one or more general-purpose microprocessors, one or more special-purpose microprocessors and/or application-specific microprocessors (ASICs), or a combination of such processing components. The instructions or data to be processed by the processor(s) may be stored in a computer-readable medium, such as a memory device. The memory device may be provided as a volatile memory, such as random access memory (RAM) or as a non-volatile memory, such as read-only memory (ROM), or as a combination of one or more RAM and ROM devices. The memory may store a variety of information and may be used for various purposes. For example, the memory may store firmware for the ISP 206 and the camera 102, such as a basic input/output system (BIOS), an operating system, various programs, applications, or any other routines that may be executed on the camera 102, including user interface functions, processor functions, and so forth. In addition, the memory may be used for buffering or caching during operation of the ISP 206 and the camera 102. In an example, the ISP 206 may be implemented in an integrated circuit, such as a system on chip (SoC).

The display device 202 may be configured to display an output image received from the ISP 206. The display device 202 may include any type of device including a display, for example, but not limited to, a display in an instrument panel of the vehicle 100, a head-up display (HUD), a smartphone, a tablet computer, a rearview or a sideview mirror including a display, and so forth. The display device 202 may include a liquid crystal display (LCD), a light-emitting diode (LED) display, a cathode ray tube (CRT) display, a plasma display panel (PDP), an electrolumiscent display (ELD), and so forth. Further, the display device 202 may be touch-enabled. The display device 202 may be fixedly or adjustably mounted on the vehicle 100. The display device 202 may be located such that the driver can view the output image displayed on the display device 202. The display device 202 may be disposed internally or externally with respect to the vehicle 100. Though one display device 202 is shown in FIG. 2, in other examples, the ISP 206 may be coupled with multiple display devices.

The imaging system 200 may allow the driver to view an object 104 located behind and/or to a side of the vehicle 100. The imaging system 200 may also process the output image to highlight one or more regions of interest in the output image. For example, the imaging system 200 may indicate one or more distance lines with respect to the vehicle 100. A distance line is a virtual line that indicates a distance from the vehicle 100. A distance line may be disposed to a rear, a front or a side of the vehicle 100. The distance may be measured from any reference point of the vehicle 100, for example, a rear end of the vehicle 100. Referring to FIG. 1, the imaging system 200 may indicate distance lines DL1, DL2, DL3 with respect to the vehicle 100 in the output image displayed on the display device 202. In the illustrated example, the distance lines DL1, DL2, DL3 are located to the rear of the vehicle 100. The distance lines DL1, DL2, DL3 may be located at distances m1, m2, m3, respectively, with respect to the vehicle 100. In the illustrated embodiment, m1<m2<m3. In an example, m1 may be about 3 meters (m), m2 may be about 10 m and m3 may be about 25 m. The distance lines DL1, DL2, DL3 may allow the driver to estimate a distance between the vehicle 100 and the object 104.

Figure 3:
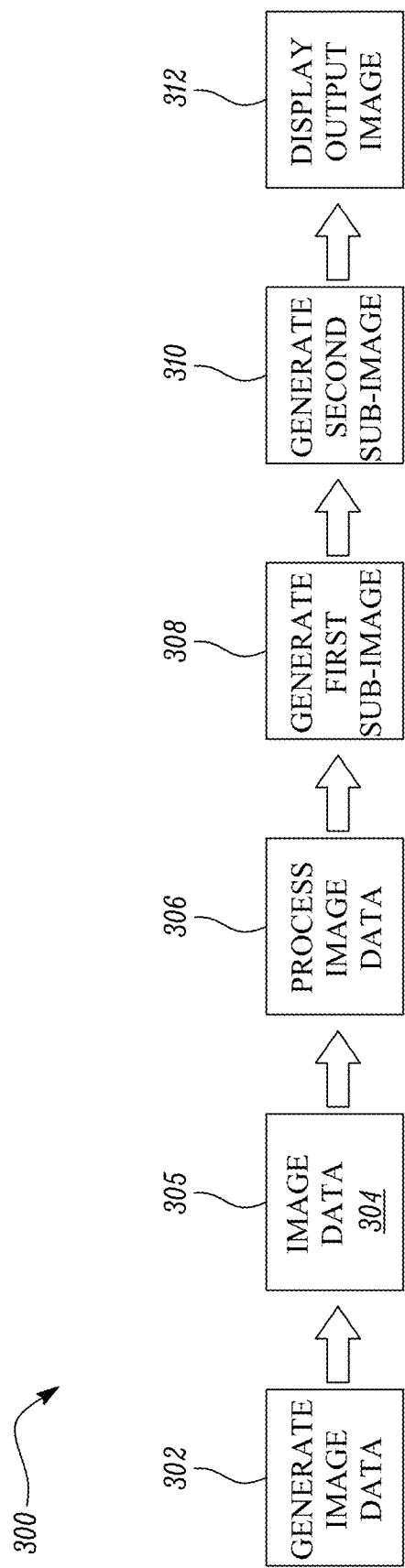
FIG. 3 is flow diagram of an example process for image processing.
Figure 4A:
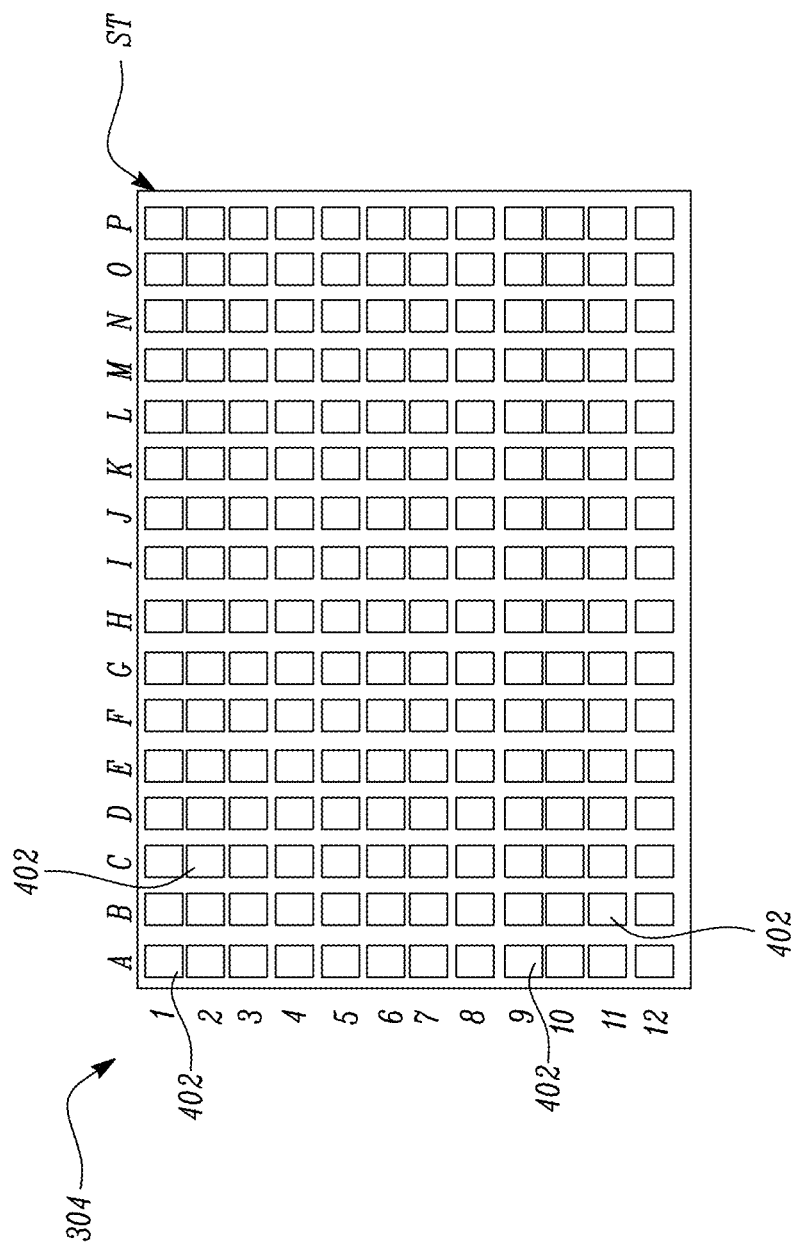
FIGS. 4A, 4B, 4C, 4D, and 4E illustrate an example of processing of image data.

FIG. 3 shows a flow diagram 300 for an example of a process for image processing implemented by the imaging system 200. Referring to FIGS. 1-3, at step 302, an image sensor 204 of the camera 102 generates image data 304. At step 305, the image data 304 is transmitted to the ISP 206 for processing. The image data 304 may include a set of pixel values corresponding to the array of pixels of the image sensor 204. The image data 304 may include a raw or unprocessed data bit stream of the pixel values. In some cases, the pixel values may include RGB (red, green, blue) data. FIG. 4A illustrates the image data 304 including a set of pixel values ST. In this example, the set of pixel values ST include one or more pixel values 402. In the illustrated example of FIG. 4A, the pixel values 402 are arranged in a 12×16 array. However, a number of rows and columns of the pixel values 402 may vary based on the configuration of the image sensor 204. Each pixel value 402 may include color data (e.g., RGB data) and intensity data. The image data 304 may dynamically change based on movement of the vehicle 100 and change in the surroundings of the vehicle 100.

Figure 4B:
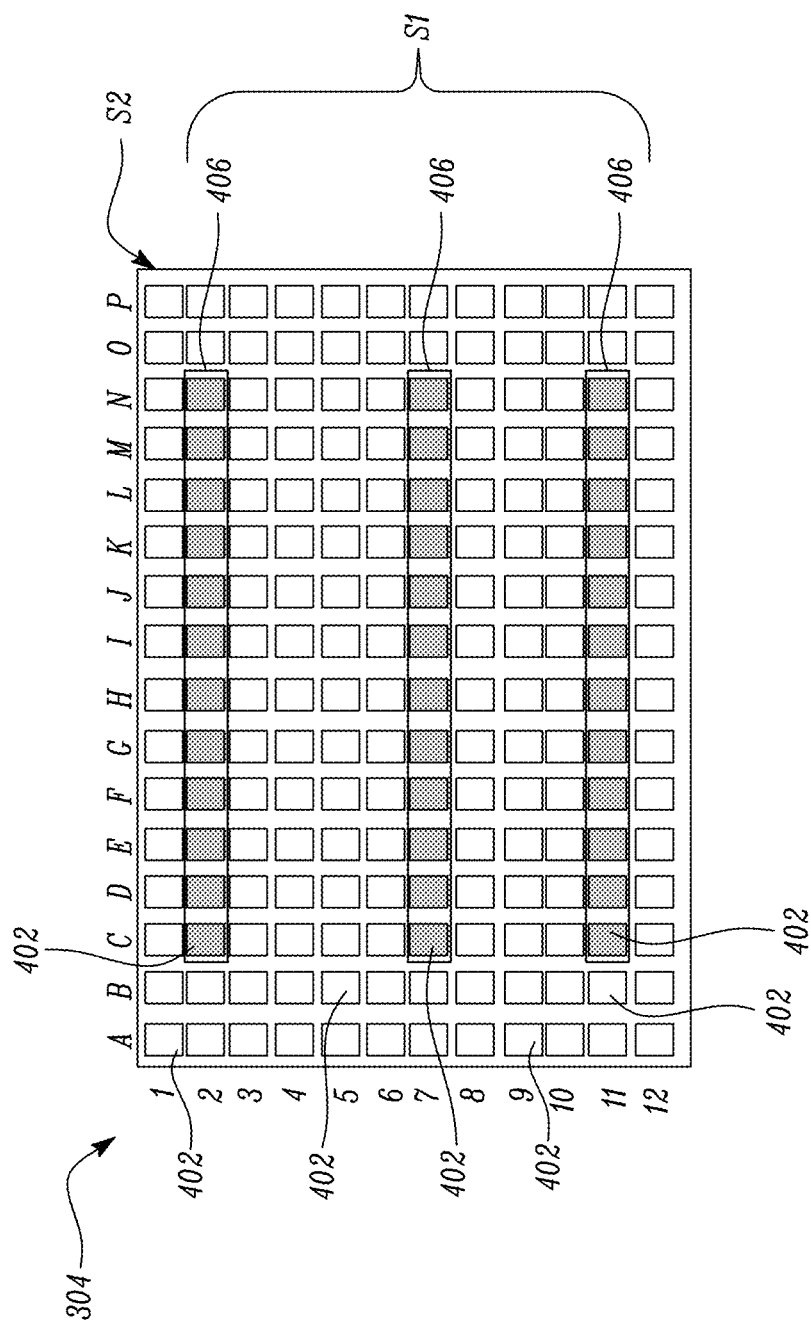

Referring back to FIG. 3, at step 306, the ISP 206 receives the image data 304 from the image sensor 204 and processes the image data 304. In an example, the ISP 206 may define a first subset of pixel values S1 from the set of pixel values ST. The first subset of pixel values S1 may correspond to at least one region of interest (ROI) in the image data 304. For example, the at least one region of interest may correspond to one or more distance lines DL1, DL2, DL3 with respect to the vehicle 100. In another example, the at least one region of interest includes at least one of an object and an icon. As shown in FIG. 4B, the first subset of pixel values S1 may correspond to three regions of interest 406 in the image data 304. Each region of interest 406 may have any suitable shape, for example, rectangular, linear, circular, polygonal, elliptical, or any irregular shape. The ISP 206 may identify the regions of interest 406 based on instructions stored in the associated memory. The regions of interest 406 may be user-defined or defined by a manufacturer. The regions of interest 406 may also dynamically change based on various parameters, such as level of ambient light (day/night), proximity to an object, speed of the vehicle 100, among other factors. A number and shapes of the regions of interest 406 may therefore vary as per application requirements. In some examples, each region of interest 406 may correspond to a distance line relative to the vehicle 100. For example, the first subset of pixel values S1 may correspond to a plurality of distance lines DL1, DL2, DL3 relative to the vehicle 100. In other examples, each region of interest 406 may include at least one of an object (e.g., image of the object 104) and an icon.

The one or more regions of interest 406 may correspond to certain ranges of pixel values 402 that represent the distance lines DL1, DL2, DL3 in the image data 304. For example, the pixel values 402 in the range from C11 to N11 may represent the distance line DL1 in the array of pixels. Further, the pixel values 402 in the range from C7 to N7 may represent the distance line DL2 in the array of pixels. Moreover, the pixel values 402 in the range from C2 to N2 may represent the distance line DL3 in the array of pixels. The first subset of pixel values S1 may therefore include the pixel values 402 from C11 to N11, from C7 to N7 and from C2 to N2.

Figure 4C:
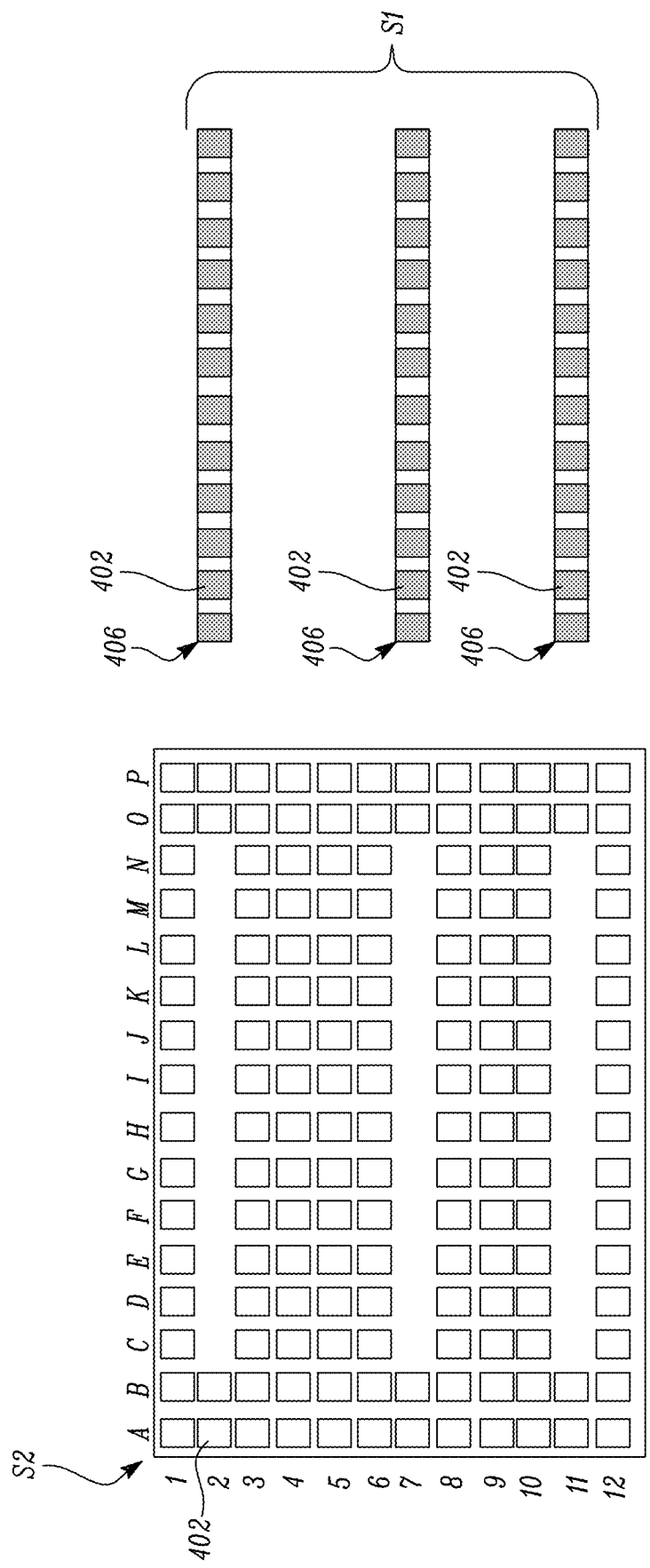

The ISP 206 may further define a second subset of pixel values S2 from the set of pixel values ST. The second subset of pixel values S2 may be complementary to the first subset of pixel values S1. In other words, the second subset of pixel values S2 may include the pixel values 402 of the set of pixel values ST that do not belong to the first subset of pixel values S1, i.e., S2=ST−S1. FIG. 4C illustrates the first subset of pixels S1 and the second subset of pixels S2 separated from each other.

In an example, the ISP 206 may process the first subset of pixel values S1 and the second subset of pixel values S2 separately. The processing of the first subset of pixel values S1 may be different from the processing of the second subset of pixel values S2. Referring back to FIG. 3 together with FIG. 4D, at step 308, the ISP 206 may generate a first sub-image IM1 using the second subset of pixel values S2. The first sub-image IMI may be a colored image or a greyscale image. The ISP 206 may perform various image processing steps on the second subset of pixel values S2, such as defective pixel detection/correction, lens shading correction, demosaicing, image sharpening, noise reduction, gamma correction, image enhancement, color-space conversion, image compression, chroma sub-sampling, among other processing steps. The ISP 206 may be further configured to perform high dynamic range (HDR) processing of the second subset of pixel values S2. HDR processing may provide a greater dynamic range of luminosity that can be perceived by a human eye. In some cases, HDR processing may include tone mapping. The ISP 206 may therefore partially generate an image, i.e., the first sub-image IMI, by processing the second subset of pixel values S2.

Figure 4D:
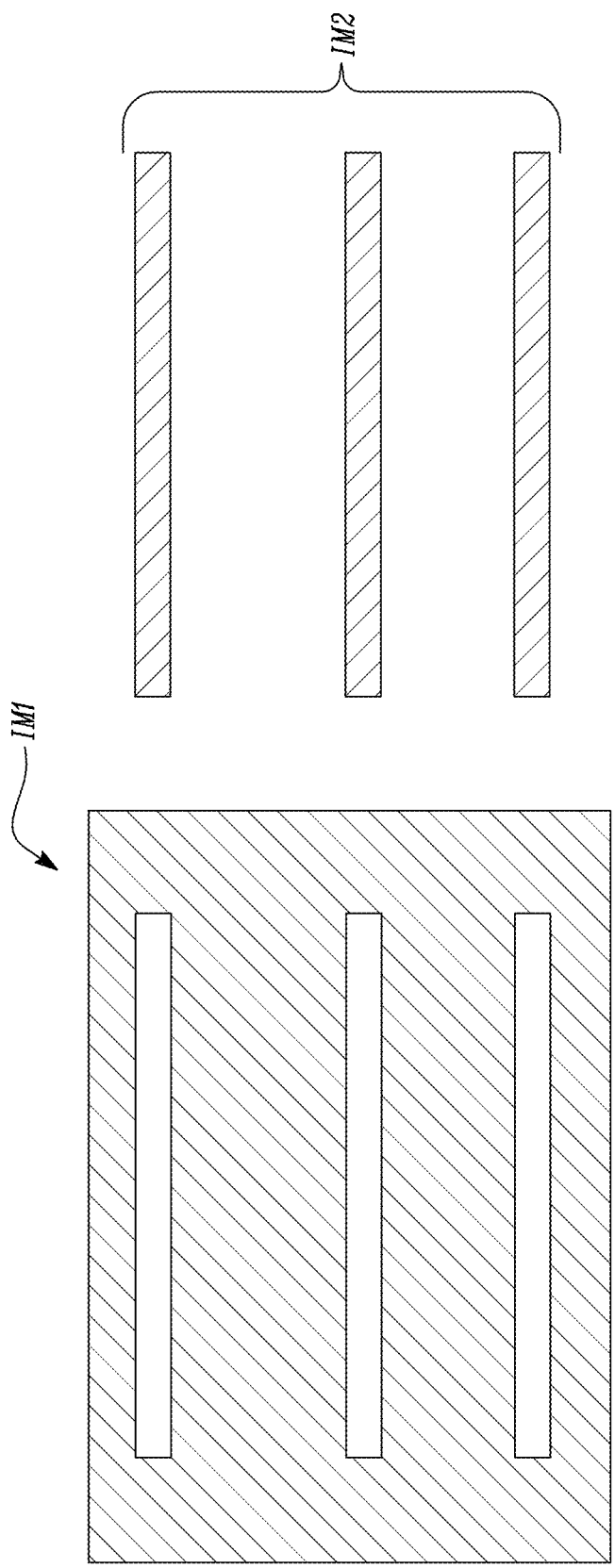

Still referring to FIG. 3 together with FIG. 4D, at step 310, the ISP 206 may generate a second sub-image IM2 using the first subset of pixel values S1. The second sub-image IM2 may be a colored image or a greyscale image. The ISP 206 may perform various image processing steps on the first subset of pixel values S1, such as defective pixel detection/correction, lens shading correction, demosaicing, image sharpening, noise reduction, gamma correction, image enhancement, color-space conversion, image compression, chroma sub-sampling, among other processing steps. The processing of the first subset of pixel values S1 may further include at least one of changing a color of one or more pixel values 402 from the first subset of pixel values S1 and scaling the first subset of pixel values S1. Processing the first subset of pixel values S1 may include pixel manipulation in addition to the processing carried out on the second subset of pixel values S2. Pixel manipulation may include color shifting and/or scaling.

In some examples, processing the first subset of pixel values S1 may further include changing a color of each pixel value 402 of the first subset of pixel values S1. In further examples, processing the first subset of pixel values S1 may also include filtering out at least one of red, green and blue colors from each pixel value 402 of the first subset of pixel values S1. Filtering of red, green and/or blue colors may be achieved by applying a color filter on the first subset of pixel values S1. Removal of red, green and/or blue colors may highlight the regions of interest 406 with respect to the adjacent areas in the image data 304. The ISP 206 may dynamically change the color of each region of interest 406 based on various parameters, such as ambient light conditions, color of the adjacent areas in the image data 304, speed of the vehicle 100, proximity of each region of interest 406 to the vehicle 100, among other parameters. For example, the ISP 206 may apply a first predefined color shift or change during the day and a second predefined color shift during the night. In another example, the ISP 206 may determine a color of each pixel value 402 surrounding each region interest of interest 406. The ISP 206 may have chosen a predefined filtering process to provide an intended color to each region of interest 406. If an intended color of the region of interest 406 is substantially close to that of the surrounding pixel values 402, the ISP 206 may adjust the color of each region of interest 406 so that the driver can recognize each region of interest 406. For example, the color of each region of interest 406, may be adjusted to a color belonging to the same color family in order to distinguish each region of interest 406 from surrounding portions. In some embodiments, the regions of interest 406 may have different colors.

The first subset of pixel values S1 may be selectively or additionally scaled. Scaling the first subset of pixel values S1 may be achieved by various interpolation techniques, such as nearest-neighbor interpolation, bilinear interpolation, among other interpolation techniques. The first subset of pixel values S1 may be interpolated outwards or inwards. The second subset of pixel values S2 may not be scaled similarly. In some examples, processing the first subset of pixel values S1 may further include magnifying the first subset of pixel values S1. The magnified regions of interest 406 when merged with the rest of the image may result in breaks or discontinuities at corresponding interfaces. The scaling ratio or amount of magnification may depend on various factors and can dynamically change as the factors change. The factors may include ambient light conditions, speed of the vehicle 100, proximity of each region of interest 406 to the vehicle 100, and so forth. For example, magnification may be increased during low ambient light conditions (e.g., during the night) as compared to good ambient light conditions (e.g., during the day). In another example, the magnification of each region of interest 406 may change based on a change in distance between each region of interest 406 and the vehicle 100. An increase in magnification may easily attract the attention of a driver. In other words, greater magnification may provide a more distinct warning to a driver. A region of interest may also be dynamically identified and magnified during an emergency. For example, an object may suddenly appear near the vehicle 100, and the corresponding region of interest in the image data 304 may be identified and magnified to attract the attention of the driver.

The ISP 206 may be further configured to perform high dynamic range (HDR) processing of the first subset of pixel values S1. HDR processing may provide a greater dynamic range of luminosity that can be perceived by a human eye. In some cases, HDR processing may include tone mapping. The ISP 206 may therefore partially generate an image, i.e., the second sub-image IM2, by processing the first subset of pixel values S1. In some examples, HDR processing of the first subset of pixel values S1 may be performed first and then pixel manipulation (scaling and/or color shifting) may be subsequently performed on the HDR processed first subset of pixel values S1.

In some examples, the ISP 206 may generate the second sub-image IM2 corresponding to all the regions of interest 406. In other examples, the ISP 206 may generate separate sub-images for the respective regions of interest 406. The processing of the regions of interest 406 may also vary from each other. For example, the color shifting and/or scaling may vary across the regions of interest 406.

Figure 4E:
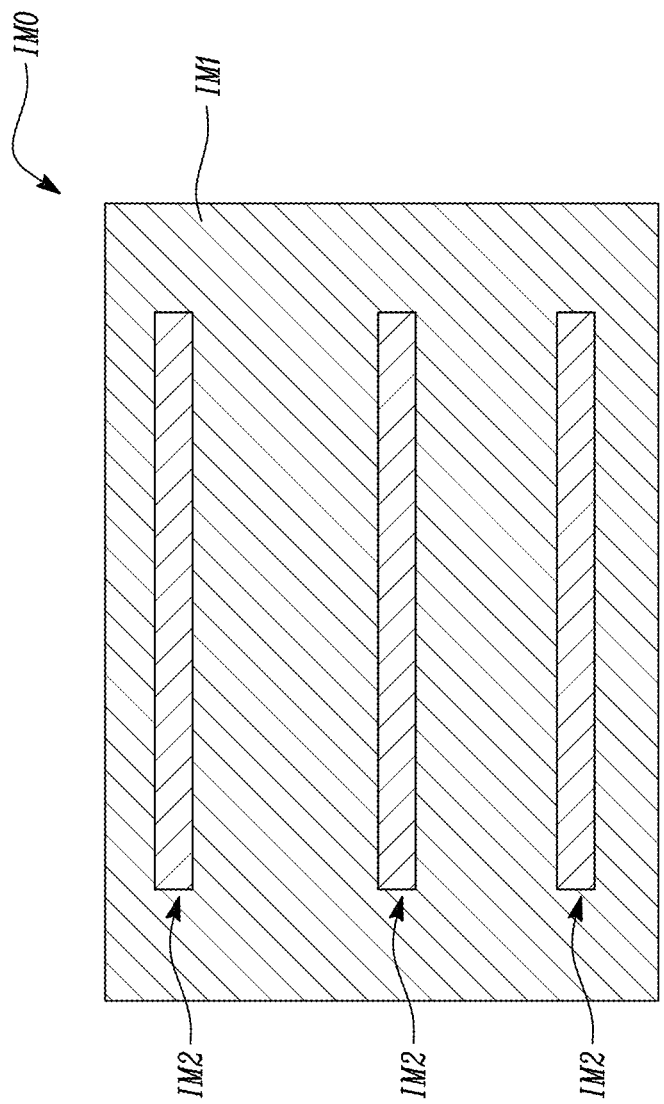

Referring to FIG. 4E, the ISP 206 may be further configured to merge the first and second sub-images IM1, IM2 to generate an output image IMO. In this example, the ISP 206 transmits the output image IMO to the display device 202. Referring back to FIG. 3, at step 312, the display device 202 displays the output image IMO received from the ISP 206. The merging of the first and second sub-images IM1, IM2 may be achieved based on locations of the pixel values 402 in the pixel array. For example, an image portion at B2, as shown in FIG. 4B, may be disposed adjacent to an image portion at C2. In case the regions of interest 406 are magnified, portions of the second sub-image IM2 may be overlaid on portions of the first sub-image IM1. Due to magnification, certain portions of the second sub-image IM2 may overlap with certain portion of the first sub-image IM1. In such cases, the portions of the second sub-image IM2 may be overlaid on the corresponding portions of the first sub-image IM1. For example, an image portion corresponding to B2 in the second sub-image IM2 may be overlaid on a corresponding image portion of the first sub-image IM1. Processed pixel values of the second sub-image IM2 may overwrite processed pixel values of the first sub-image IM1.

Portions of the output image IMO corresponding to the regions of interest 406 may have undergone pixel manipulation that has not been implemented in the rest of the output image IMO. The output image IMO may dynamically change based on the movement of the vehicle 100 and change in surroundings. In some examples, the ISP 206 may further generate a video output for display at the display device 202.

In the illustrated example of FIG. 3, all the processing of the image data 304 may be done by the ISP 206 in a pre-processing stage, i.e., at steps 306, 308 and 310. Pre-processing may include any activity that occurs before an image is generated from raw data. In some examples, no post-processing may be required on the output image IMO. Post-processing may include any activity that occurs after the image is generated from raw data. For example, no overlay may have to be applied on top of the output image IMO by post-processing.

Figure 5A:
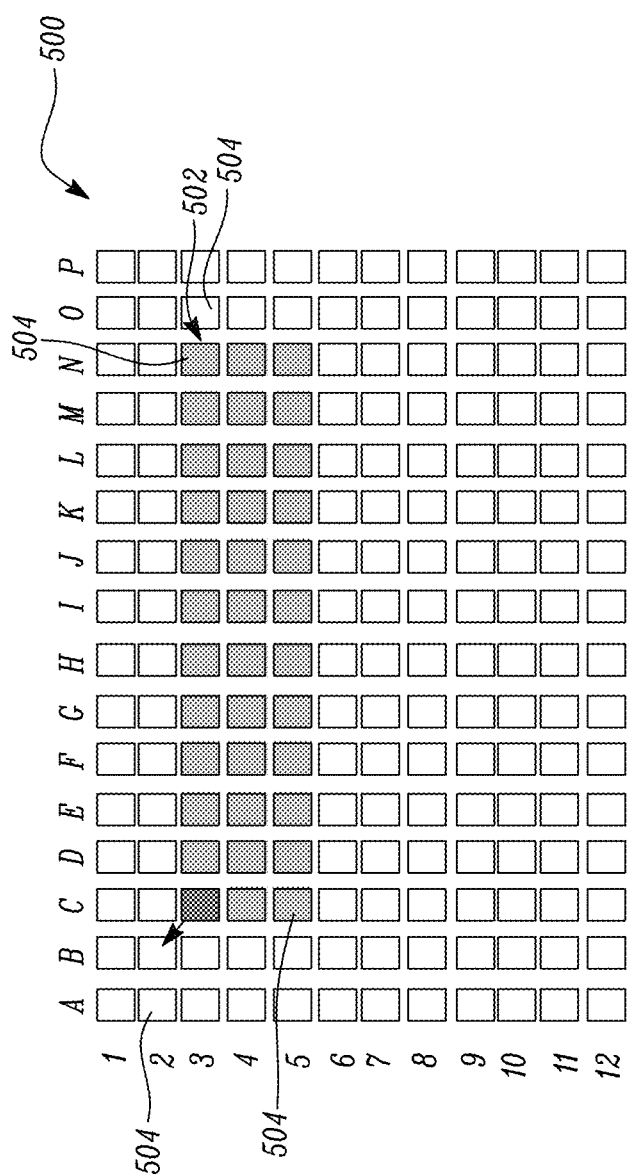
FIGS. 5A and 5B illustrate an example of magnifying a region of interest in image data.
Figure 5B:
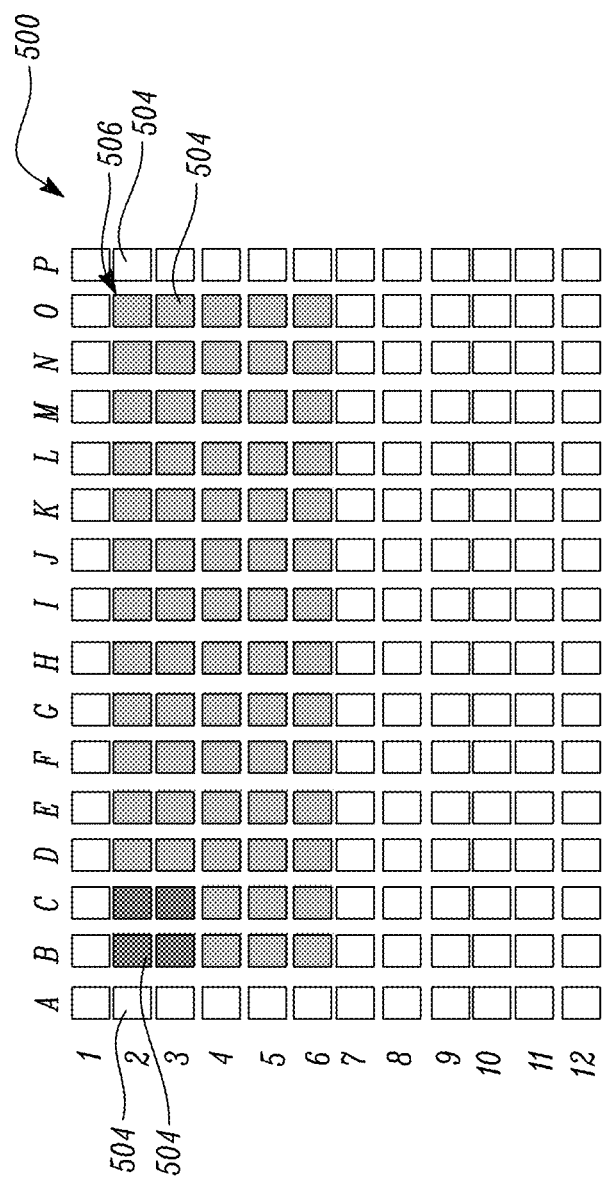

FIGS. 5A and 5B illustrate an example of a pixel manipulation method for magnifying a region of interest 502 in image data 500. In this example, image data 500 includes an array of pixel values 504 arranged in a 12×16 array. The region of interest 502 is a rectangular region with C3, C5, N3 and N5 as its corners. One or more of the pixel values 504 in the region of interest 502 may be interpolated outwards for magnifying the region of interest 502. The ISP 206 (shown in FIG. 3) may perform the magnification. The pixel value 504 at C3 may be interpolated to adjoining pixels, namely, B2, B3 and C2. Similarly, the pixel value 504 at C4 may be interpolated to B4. Other pixel values 504 may be similarly interpolated and an example of the resulting magnified region 506 is shown in FIG. 5B. The interpolated pixel values 504 may be overlaid on the surrounding pixel values 504. The interpolated pixel values 504 of the magnified region 506 may overwrite the surrounding pixel values 504. Since only the region of interest 502 is magnified and not the other parts of the image data 500, discontinuities or breaks may be present at one or more interfaces between the magnified region 506 and surrounding portions of the image. For example, a break may be present between rows 1 and 2.

Figure 6A:
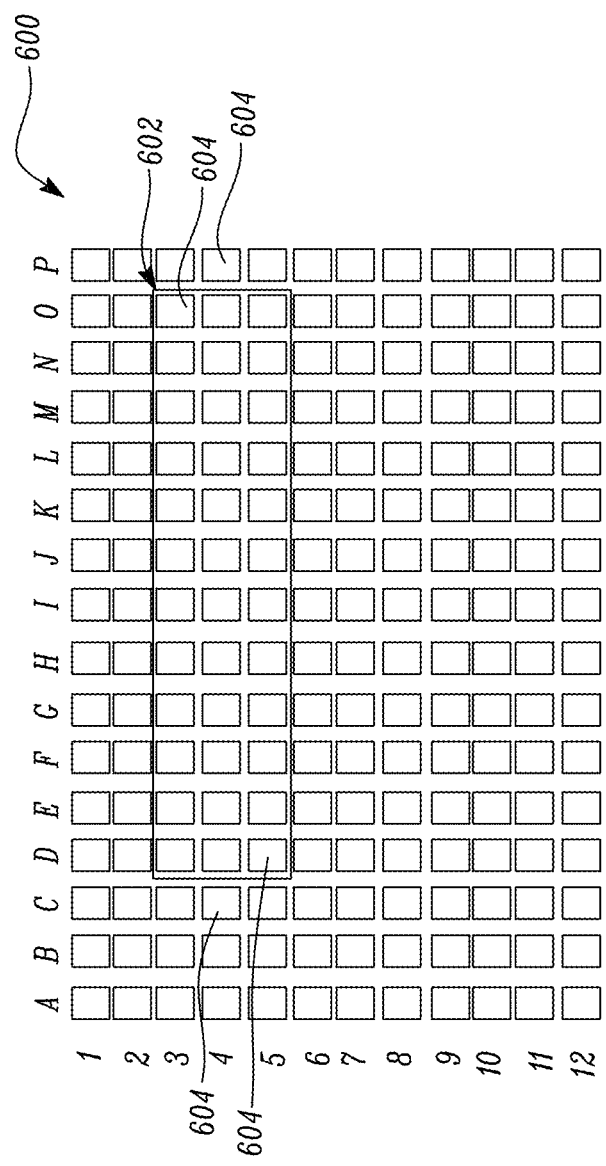
FIGS. 6A and 6B illustrate examples of changing a color of a region of interest in image data.
Figure 6B:
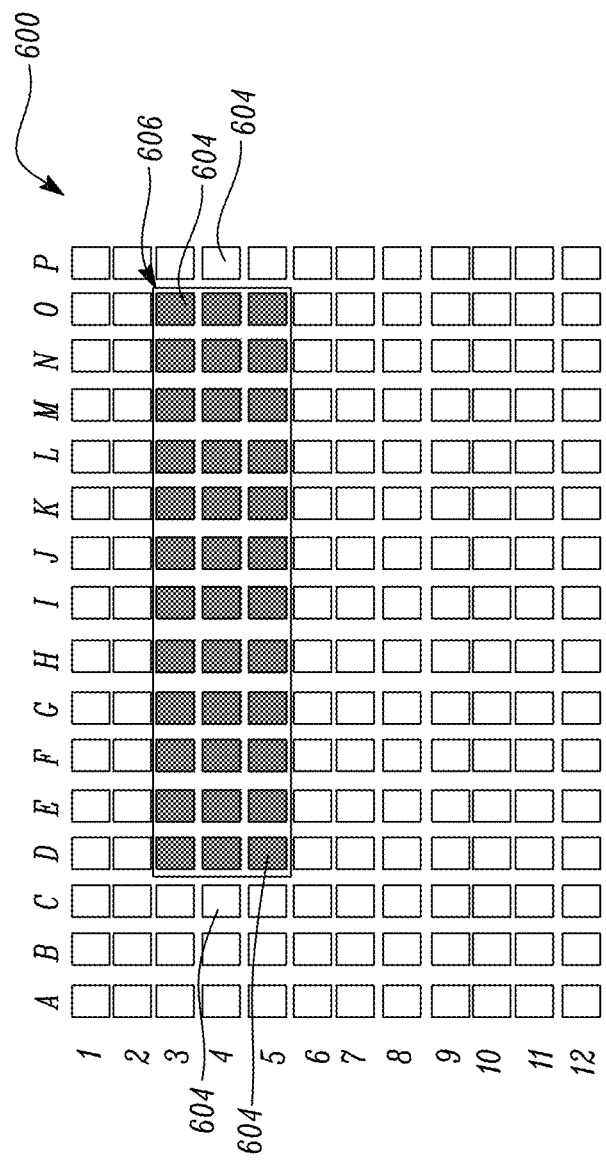

FIGS. 6A and 6B illustrate an exemplary color shifting method of a region of interest 602 in image data 600. The image data 600 includes an array of pixel values 604 arranged in a 12×16 array. The region of interest 602 is a rectangular region with D3, D5, O3 and O5 as its corners. Color of one or more pixel values 604 in the region of interest 602 may be changed by the ISP 206. In the illustrated embodiment of FIG. 6B, a color of each pixel value 604 in the region of interest 602 is changed. The color may be changed by filtering out at least one of red, green and blue colors from each pixel value 604 in the region of interest 602. Color shifting may result in a color shifted region 606 shown in FIG. 6B.

Figure 7:
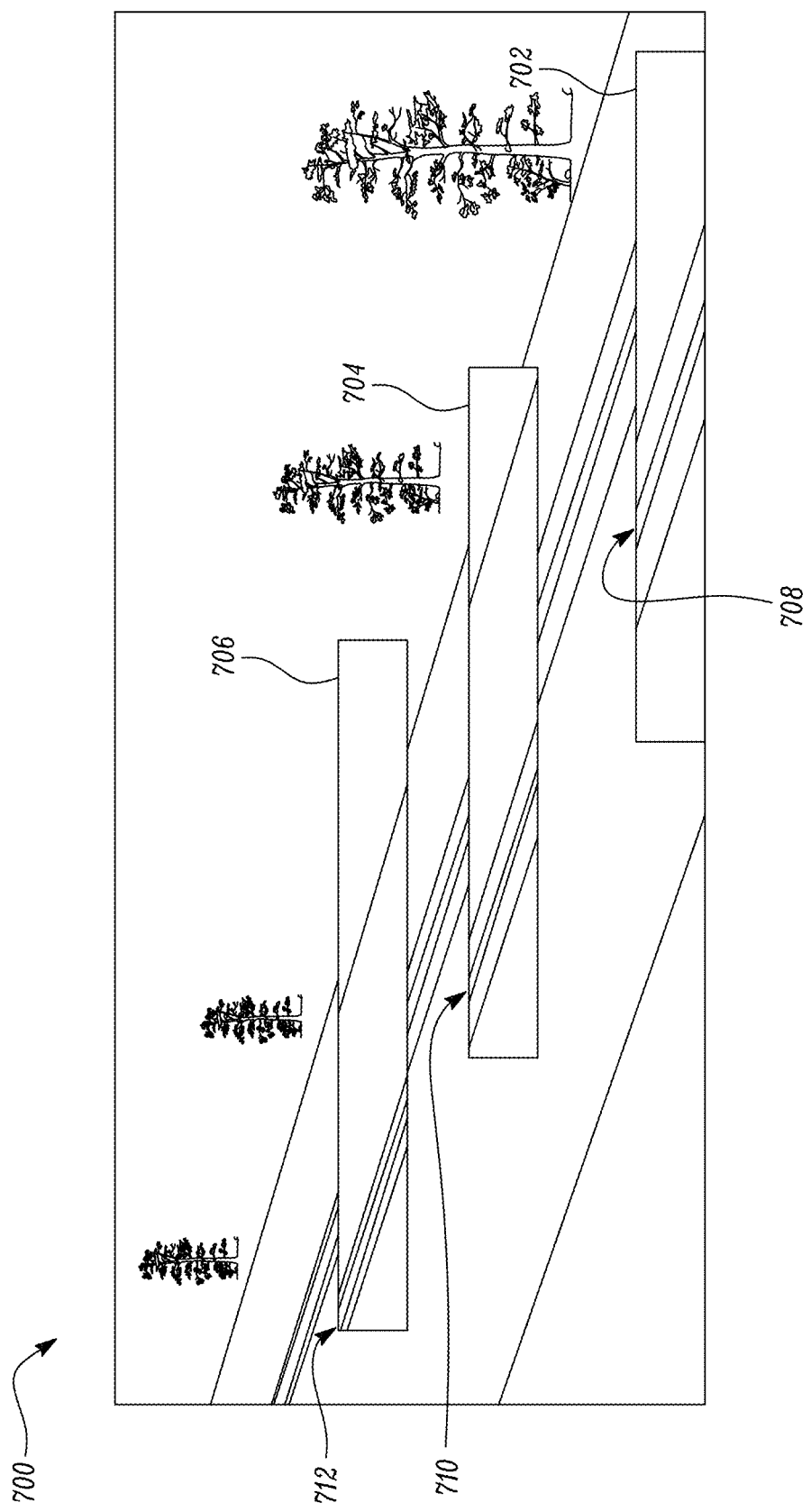
FIGS. 7 and 8 illustrate an example of output images with regions of interest.

FIG. 7 illustrates an example of an output image 700 displayed on the display device 202, as previously illustrated in FIG. 2. The output image 700 may include one or more regions of interest 702, 704, and 706 which correspond to one or more respective distance lines. For example, the one or more regions of interest 702, 704, and 706 may correspond to distance lines DL1, DL2 and DL3, respectively, as described in reference with FIG. 1. In this example, the regions of interest 702, 704 and 706 are magnified with respect to other regions of the output image 700. Due to magnification, breaks 708, 710, 712 may be disposed between the respective regions of interest 702, 704, 706 and the adjoining portions of the output image 700 that are not similarly magnified. In an example, the breaks 708, 710, 712 may be easily noticeable by the driver. Using the breaks 708, 710, 712, the driver may be able to estimate distances between the vehicle 100 and different objects such as object 104 described in reference to FIG. 1.

Figure 8:
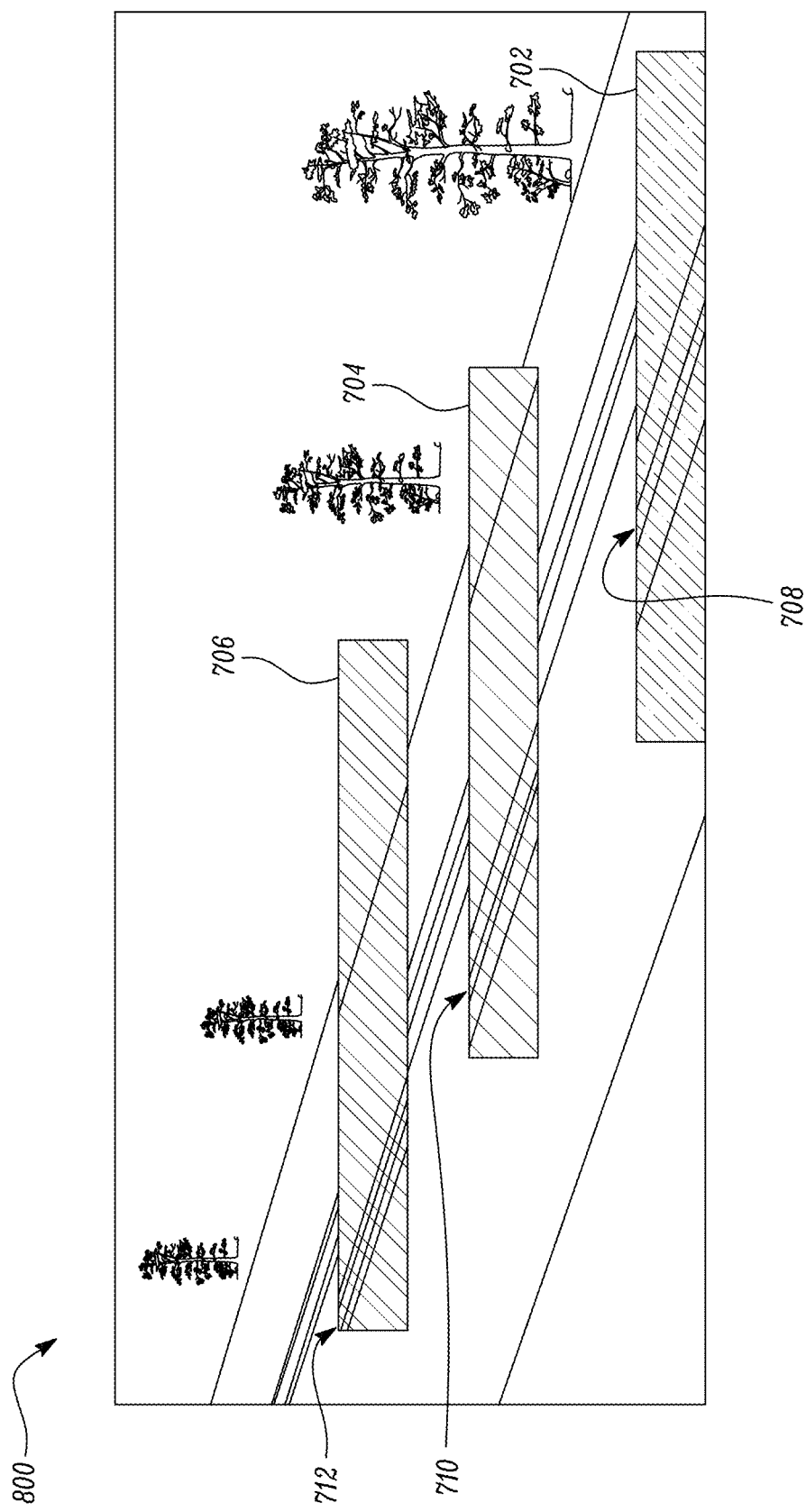

FIG. 8 illustrates another example of an output image 800 that is similar to the output image 700. In this example, the three regions of interest 702, 704 and 706 in the output image 800 are colored. The pixel values in the three regions of interest 702, 704 and 706 have been color shifted so that three regions of interest 702, 704 and 706 have different colors with respect to the surrounding portions of the output image 800. Further, in an example, the three regions of interest 702, 704 and 706 may have colors that are different from each other. The colors in the three regions of interest 702, 704, 706 may be changed by filtering out red, green and/or blue colors in the corresponding pixel values. The color-coded regions of interest 702, 704 and 706 may provide additional information to the driver.

Figure 9:
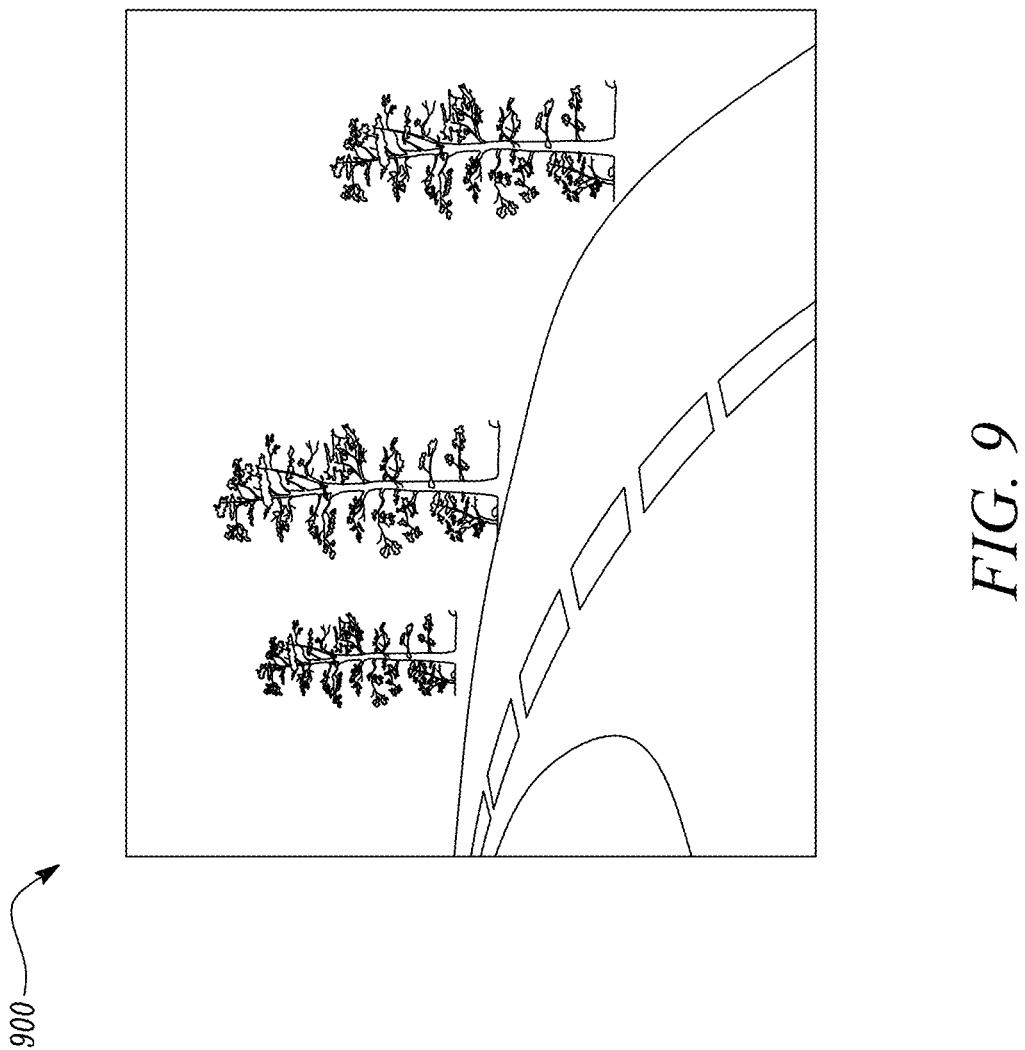
FIG. 9 illustrates an example of an image without any region of interest.
Figure 10:
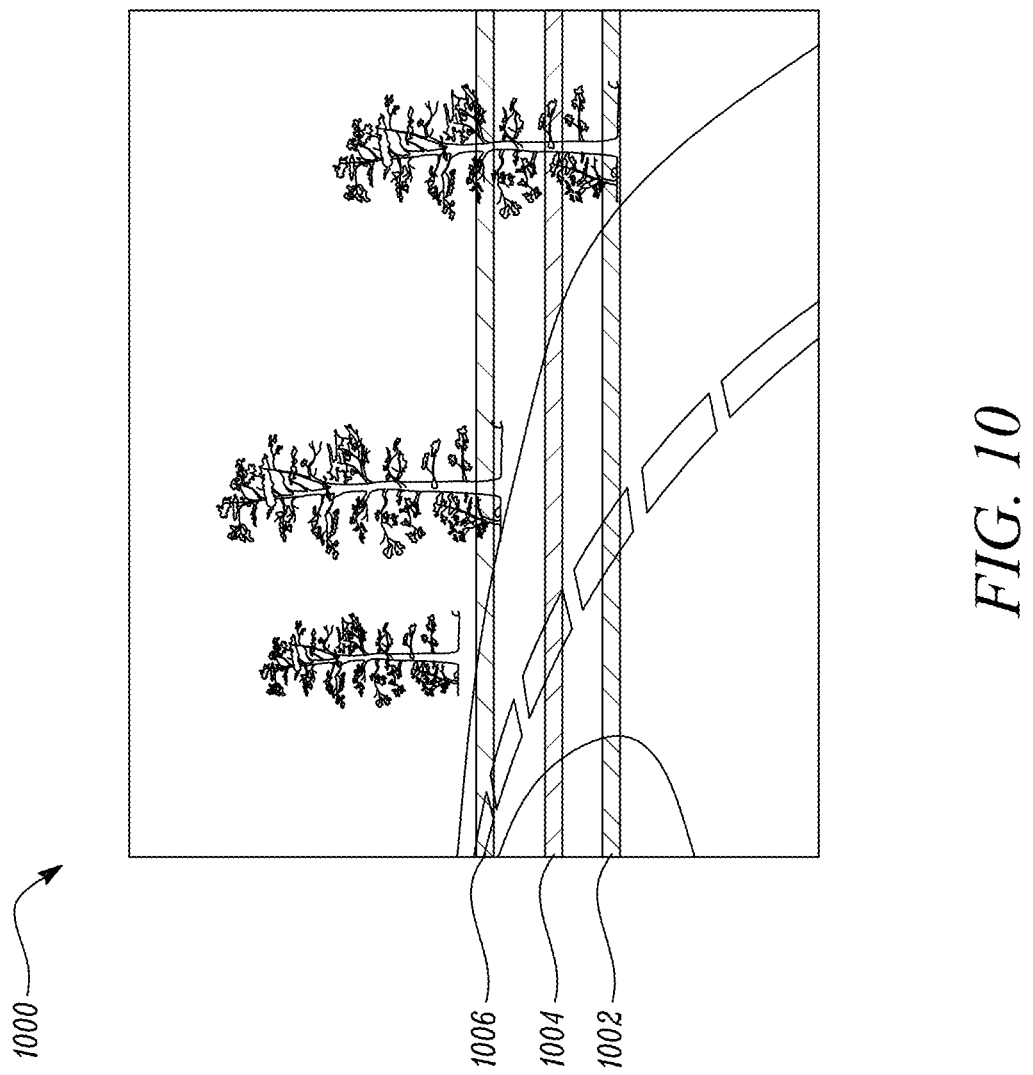
FIGS. 10, 11, and 12 illustrate an example of output images with regions of interest.
Figure 11:
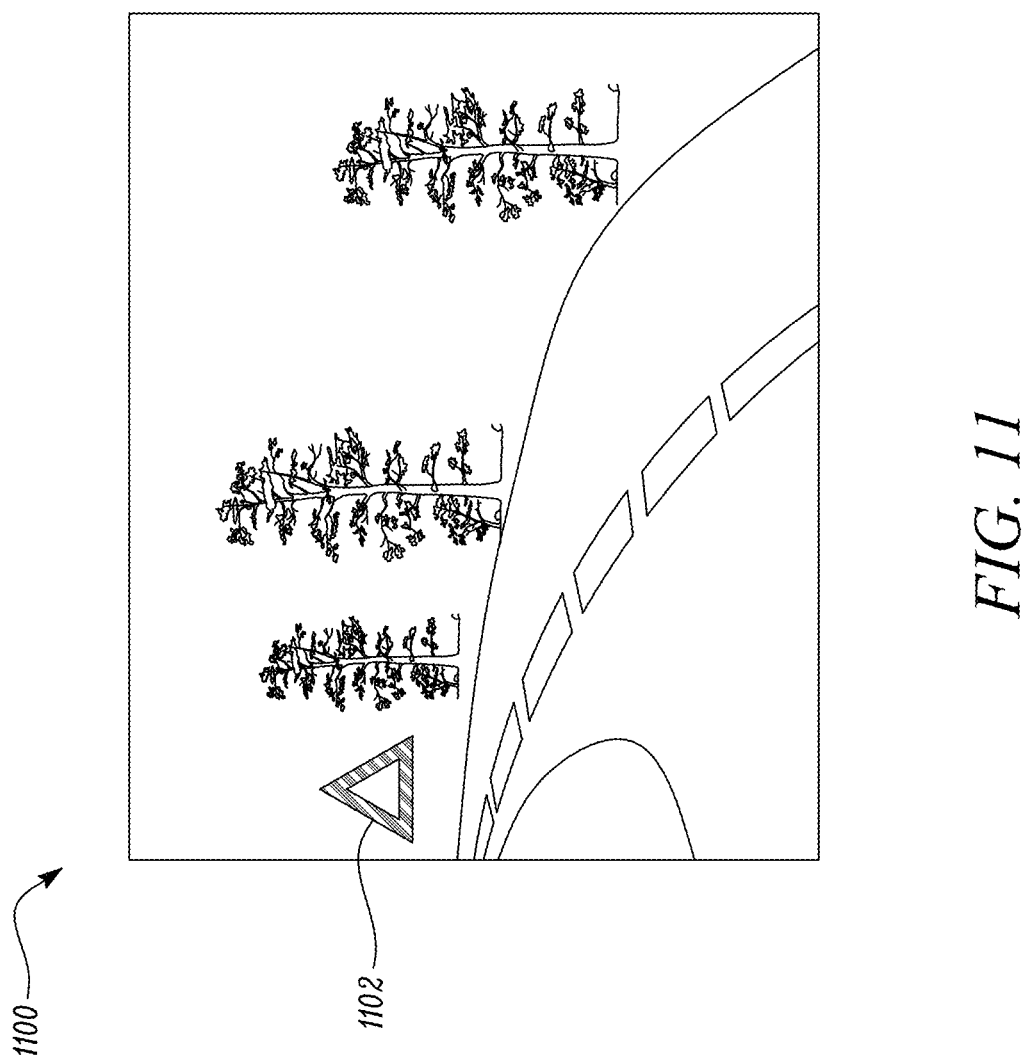
Figure 12:
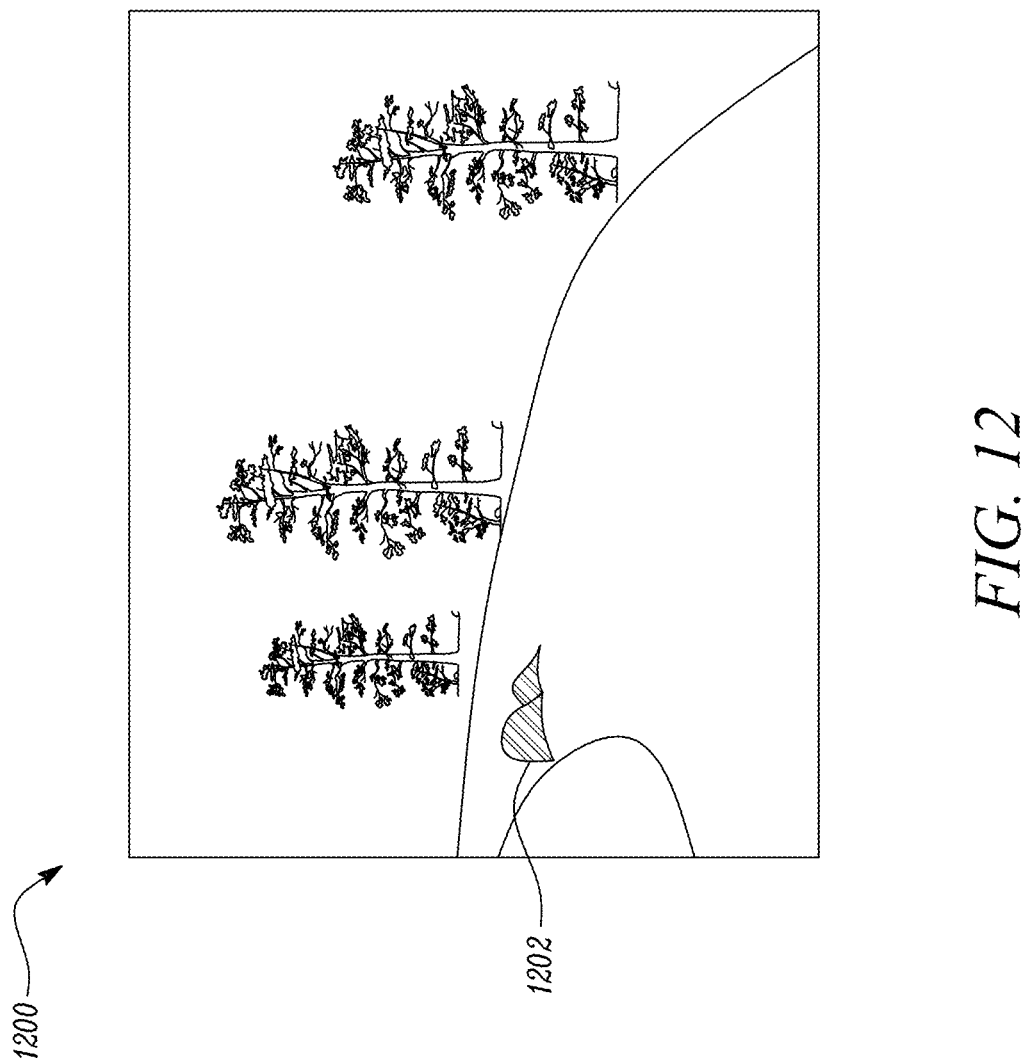

FIG. 9 illustrates an example of an image 900 without any region of interest. FIG. 10 illustrates an example of an output image 1000 with three regions of interest 1002, 1004, 1006. Each region of interest 1002, 1004, 1006 in this example is a rectangular region corresponding to a respective distance line. For example, the regions of interest 1002, 1004, 1006 may correspond to the distance lines DL1, DL2, DL3, respectively, as described in reference with FIG. 1. A color of each region of interest 1002, 1004, 1006 may be changed in order to attract the attention of the driver. The colors of the regions of interest 1002, 1004, 1006 may be different from each other. FIG. 11 illustrates an output image 1100 including a region of interest 1102. The region of interest 1102 is an icon with a substantially triangular shape. The region of interest 1102 may be generated by changing the color of the corresponding pixel values. The icon may provide a warning to the driver. FIG. 12 illustrates an example of an output image 1200 with a region of interest 1202. The region of interest 1202 may be an object, such as an obstruction on a road. A color of the region of interest 1202 may be changed to alert the driver.

Figure 13A:
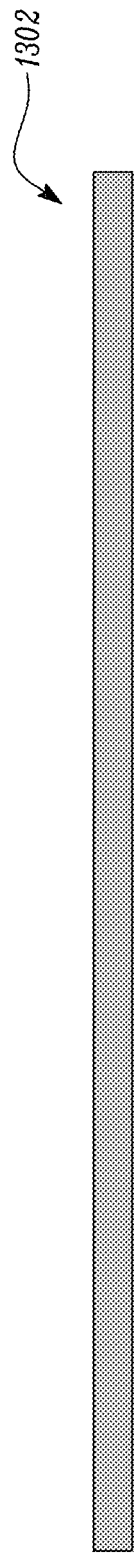
FIGS. 13A and 13B illustrate an example of a change in color of a region of interest.
Figure 13B:

FIGS. 13A and 13B illustrate an example of a change in color of one or more regions of interest 1302. The region of interest 1302 may be any one of the regions of interest 1002, 1004, 1004 shown in FIG. 10. The color of the region of interest 1302 has been changed in the example of FIG. 13B. In some examples, the color of the region of interest 1302 may be changed in response to an intended or present color of the region of interest 1302 being similar to surrounding portions of the image. The color of the region of interest 1302 may be adjusted to a similar color (for example, a different shade of red) or a different color that can be recognized by the driver.

Figure 14:
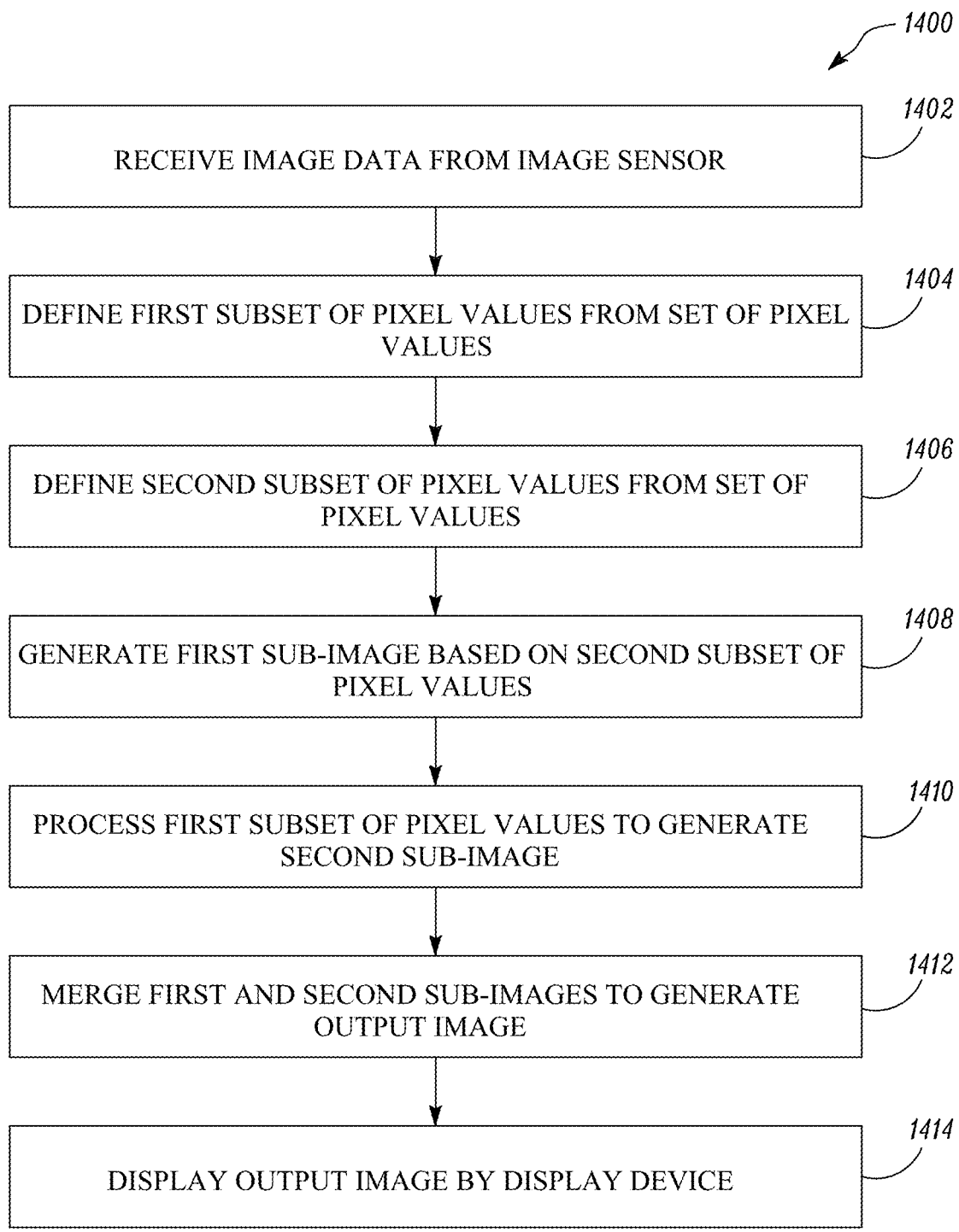
FIG. 14 is a flow chart illustrating an example of an imaging method for a vehicle.

FIG. 14 is a flowchart illustrating an example of an imaging method 1400 (hereinafter referred to as "the method 1400") for a vehicle. The method 1400 may be implemented using an imaging system, such as the imaging system 200 described above in reference with FIG. 2, for a vehicle, such as the vehicle 100 described above in reference with FIG. 1. Referring to FIGS. 1-14, at step 1402, the method 1400 includes receiving the image data 304 from the image sensor 204 disposed on the vehicle 100. The image data 304 includes the set of pixel values ST. The ISP 206 receives the image data 304 from the image sensor 204.

At step 1404, the ISP 206 defines a first subset of pixel values S1 from the set of pixel values ST. The first subset of pixel values S1 may correspond to at least one region of interest in the image data 304. In an example, the at least one region of interest may correspond to one or more distance lines DL1, DL2, DL3 with respect to the vehicle 100, as described above in reference with FIG. 1. In another example, the at least one region of interest includes at least one of an object and an icon.

At step 1406, the ISP 206 may define a second subset of pixel values S2 from the set of pixel values ST. The second subset of pixel values S2 may be complementary to the first subset of pixel values S1.

At step 1408, the ISP 206 may generate a first sub-image IM1 based on the second subset of pixel values S2.

At step 1410, the ISP 206 may process the first subset of pixel values S1 to generate the second sub-image IM2. Processing the first subset of pixel values S1 may include at least one of changing a color of one or more pixel values 402 from the first subset of pixel values S1 and scaling the first subset of pixel values S1. In an example, the processing of the first subset of pixel values S1 may include changing a color of each pixel value 402 of the first subset of pixel values. In another example, the processing of the first subset of pixel values S1 may include magnifying the first subset of pixel values S1. In some examples, the method 1400 may further include performing high dynamic range (HDR) processing of the first subset of pixel values S1. In additional examples, the method 1400 may further include performing high dynamic range (HDR) processing of the second subset of pixel values S2.

At step 1412, the ISP 206 may merge the first and second sub-images IM1, IM2 to generate an output image IMO. In an example, portions of the first sub-image IM1 may be overlaid or superimposed on corresponding portions of the second sub-image IM2.

At step 1414, the method 1400 may further include displaying the output image IMO by the display device 202 disposed on the vehicle 100, as described above in reference with FIGS. 1 and 2. In this example, the ISP 206 may transmit the output image IMO to the display device 202, and the display device 202 may display the output image IMO.

In certain aspects, the imaging system 200 and the method 1400 enable processing of one or more regions of interest in image data during the pre-processing stage, i.e., before an output image is generated. In an example, post-processing of the output image may not be required. For example, there is no requirement for applying an overlay on top of the output image by post-processing. As a result, processing time and computing requirements may be reduced.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

Furthermore, the features of the disclosure disclosed in this specification, the claims and the drawings may be employed both individually and in any possible combination for practicing the disclosure in its various exemplary embodiments. In particular, all claim feature combinations, irrespective of the claim dependencies, are covered with this application.

LIST OF NUMBERS

100 Vehicle
102 Camera
104 Object
200 Imaging System
202 Display Device
204 Image Sensor
206 Image Signal Processor (ISP)
DL1 Distance Line
DL2 Distance Line
DL3 Distance Line
m1 Distance
m2 Distance
m3 Distance
300 Process Flow
302 Block
304 Image Data
305 Block
306 Block
308 Block
310 Block
312 Block
402 Pixel Values
406 Regions Of Interest
ST Set Of Pixel Values
S1 First Subset Of Pixel Values
S2 Second Subset Of Pixel Values IM1 First Sub-Image
IM2 Second Sub-Image
IMO Output Image
500 Image Data
502 Region Of Interest
504 Pixel Values
506 Magnified Region
600 Image Data
602 Region Of Interest
604 Pixel Values
606 Color Shifted Region
700 Output Image
702 Region of Interest
704 Region of Interest
706 Region Of Interest
708 Break
710 Break
712 Break
800 Output Image
900 Image
1000 Output Image
1002 Region Of Interest
1004 Region Of Interest
1006 Region Of Interest
1100 Output Image
1102 Region Of Interest
1200 Output Image
1202 Region Of Interest
1302 Region Of Interest
1400 Imaging Method
1402 Step
1404 Step
1406 Step
1408 Step
1410 Step
1412 Step
1414 Step

The invention claimed is:

1. An imaging system for a vehicle, the imaging system comprising:
 an image sensor disposed on the vehicle and configured to generate image data, the image data comprising a set of pixel values;
 an image signal processor (ISP) communicably coupled to the image sensor, the ISP configured to:
  receive the image data from the image sensor;
  define a first subset of pixel values from the set of pixel values, the first subset of pixel values corresponding to one or more distance lines that indicate a distance from the vehicle;
  define a second subset of pixel values from the set of pixel values, the second subset of pixel values being complementary to the first subset of pixel values;
  generate a first sub-image based on the second subset of pixel values;
  process the first subset of pixel values to generate a second sub-image, wherein processing the first subset of pixel values comprises at least one of:
   (i) changing a color of one or more pixel values from the first subset of pixel values; and
   (ii) scaling the first subset of pixel values;
  merge the first and second sub-images to generate an output image; and
 a display device configured to display the output image received from the ISP,
 wherein processing the first subset of pixel values results in an increased visual contrast between the one or more distance lines and other portions of the output image,
 wherein processing of the first subset of pixel values corresponding to the one or more distance lines comprises both changing the color of the one or more distance lines and magnifying the one or more distance lines with respect to other regions of the output image,
 wherein the magnifying the one or more distance lines results in breaks and/or discontinuities in the output image between one or more magnified portions of the output image and one or more non-magnified portions of the output image,
 wherein the first subset of pixel values corresponds to the magnified portion of the output image, and
 wherein the one or more distance lines dynamically change based on movement of the vehicle and/or change in the surroundings of the vehicle.

2. The imaging system of claim 1, wherein the processing of the first subset of pixel values comprises changing a color of each pixel value of the first subset of pixel values.

3. The imaging system of claim 2, wherein the processing of the first subset of pixel values further comprises filtering out at least one of red, green and blue colors from each pixel value of the first subset of pixel values.

4. The imaging system of claim 1, wherein the processing of the first subset of pixel values comprises magnifying the first subset of pixel values.

5. The imaging system of claim 1, wherein the ISP is further configured to perform high dynamic range (HDR) processing of the first subset of pixel values.

6. The imaging system of claim 1, wherein the ISP is further configured to perform high dynamic range (HDR) processing of the second subset of pixel values.

7. An imaging method for a vehicle, the imaging method comprising:
 receiving image data from an image sensor disposed on the vehicle, the image data comprising a set of pixel values;
 defining a first subset of pixel values from the set of pixel values, the first subset of pixel values corresponding to one or more distance lines that indicate a distance from the vehicle;
 defining a second subset of pixel values from the set of pixel values, the second subset of pixel values being complementary to the first subset of pixel values;
 generating a first sub-image based on the second subset of pixel values;
 processing the first subset of pixel values to generate a second sub-image, wherein processing the first subset of pixel values comprises at least one of:
  (i) changing a color of one or more pixel values from the first subset of pixel values; and
  (ii) scaling the first subset of pixel values;
 merging the first and second sub-images to generate an output image; and
 displaying the output image by a display device,
 wherein processing the first subset of pixel values results in an increased visual contrast between the one or more distance lines and other portions of the output image,
 wherein processing of the first subset of pixel values corresponding to the one or more distance lines comprises both changing the color of the one or more distance lines and magnifying the one or more distance lines with respect to other regions of the output image,
 wherein the magnifying the one or more distance lines results in breaks and/or discontinuities in the output image between one or more magnified portions of the output image and one or more non-magnified portions of the output image, wherein the first subset of pixel values corresponds to the magnified portion of the output image, and wherein the one or more distance lines dynamically change based on movement of the vehicle and/or change in the surroundings of the vehicle.

8. The imaging method of claim 7, wherein the processing of the first subset of pixel values comprises changing a color of each pixel value of the first subset of pixel values.

9. The imaging method of claim 7, wherein the processing of the first subset of pixel values comprises magnifying the first subset of pixel values.

10. The imaging method of claim 7, further comprising performing high dynamic range (HDR) processing of the first subset of pixel values.

11. The imaging method of claim 7, further comprising performing high dynamic range (HDR) processing of the second subset of pixel values.

12. An imaging system for a vehicle, the imaging system comprising:

an image sensor disposed on the vehicle and configured to generate image data, the image data comprising a set of pixel values;

an image signal processor (ISP) communicably coupled to the image sensor, the ISP configured to:

receive the image data from the image sensor;

define a first subset of pixel values from the set of pixel values, the first subset of pixel values corresponding to a visual icon or identified object;

define a second subset of pixel values from the set of pixel values, the second subset of pixel values being complementary to the first subset of pixel values;

generate a first sub-image based on the second subset of pixel values;

process the first subset of pixel values to generate a second sub-image, wherein processing the first subset of pixel values comprises at least one of:

(i) changing a color of one or more pixel values from the first subset of pixel values; and (ii) scaling the first subset of pixel values;

merge the first and second sub-images to generate an output image; and a display device configured to display the output image received from the ISP, wherein processing the first subset of pixel values results in an increased visual contrast between the visual icon or identified object and other portions of the output image, wherein processing of the first subset of pixel values corresponding to the one or more distance lines comprises both changing the color of the one or more distance lines and magnifying the one or more distance lines with respect to other regions of the output image, wherein the magnifying the one or more distance lines results in breaks and/or discontinuities in the output image between one or more magnified portions of the output image and one or more non-magnified portions of the output image, wherein the first subset of pixel values corresponds to the magnified portion of the output image, and wherein the one or more distance lines dynamically change based on movement of the vehicle and/or change in the surroundings of the vehicle.

13. The imaging system of claim 12, wherein the processing of the first subset of pixel values comprises changing a color of each pixel value of the first subset of pixel values.

14. The imaging system of claim 13, wherein the processing of the first subset of pixel values further comprises filtering out at least one of red, green and blue colors from each pixel value of the first subset of pixel values.

15. The imaging system of claim 12, wherein the processing of the first subset of pixel values comprises magnifying the first subset of pixel values.

16. The imaging system of claim 12, wherein the ISP is further configured to perform high dynamic range (HDR) processing of the first subset of pixel values.

17. The imaging system of claim 12, wherein the ISP is further configured to perform high dynamic range (HDR) processing of the second subset of pixel values.

* * * * *